United States Patent [19]

Gomberg

[11] 4,071,386
[45] Jan. 31, 1978

[54] HYBRID SOLID FILLED PNEUMATIC TIRE

[75] Inventor: Edward N. Gomberg, Tustin, Calif.

[73] Assignee: Synair, Tustin, Calif.

[21] Appl. No.: 661,304

[22] Filed: Feb. 25, 1976

Related U.S. Application Data

[60] Division of Ser. No. 514,656, Oct. 15, 1974, abandoned, and a continuation-in-part of Ser. No. 397,940, Sept. 17, 1973, abandoned.

[51] Int. Cl.$^2$ .......................................... B29H 13/00
[52] U.S. Cl. ............................. 156/113; 152/330 RF; 152/339; 152/347; 156/115; 156/121
[58] Field of Search .................................... 156/77–79, 156/87, 95–97, 112, 113, 115, 123; 152/157, 166, 310–314, 318, 323, 330 RF, 339, 340, 347, 399, 400

[56] References Cited

U.S. PATENT DOCUMENTS

| | | | |
|---|---|---|---|
| 1,064,766 | 6/1913 | Pfouts | 152/314 |
| 1,274,883 | 8/1918 | Hofmeister | 152/314 |
| 2,018,189 | 10/1935 | Prince | 152/313 |
| 2,399,572 | 4/1946 | Powell et al. | 152/400 |
| 3,022,810 | 2/1962 | Lambe | 152/313 R |
| 3,095,917 | 7/1963 | Arsandaux | 152/312 |
| 3,381,735 | 5/1968 | Talcott et al. | 152/313 |
| 3,854,516 | 12/1974 | Burnell | 152/313 |
| 3,866,651 | 2/1975 | Gamberg | 152/313 |
| 3,866,652 | 2/1975 | Ahmad | 152/312 |
| 3,872,201 | 3/1975 | Paul et al. | 152/313 |

FOREIGN PATENT DOCUMENTS

| | | | |
|---|---|---|---|
| 672,372 | 5/1952 | United Kingdom | 156/113 |

*Primary Examiner*—Charles E. Van Horn
*Assistant Examiner*—John E. Kittle
*Attorney, Agent, or Firm*—Gausewitz, Carr & Rothenberg

[57] ABSTRACT

A substantially conventional tubeless or tube-type tire casing is mounted on a wheel and contains a centrifugally distributed solid elastic fill material which is deflation proof. A heat curable elastomer is injected into the casing in liquid form, the casing is pneumatically pressurized to seat upon the wheel rims, and the assembly is rotated to centrifugally distribute and position the liquid elastomer until it has cured. Alternatively, a pressurizable tube of relatively small diameter extends about the wheel within the casing and between the beads and rims of the casing and wheel. The tube is belted to limit its radially outward expansion and is filled with air at a pressure sufficient to securely hold the casing beads on the wheel rims. The elastic fill material may have characteristics providing a ride equivalent to a relatively low air pressure and at the same time, the casing will be securely locked to the wheel by relatively high pressure in the belted tube. Where the tube is used, the elastomer may be cured within the casing with or without spinning.

2 Claims, 4 Drawing Figures

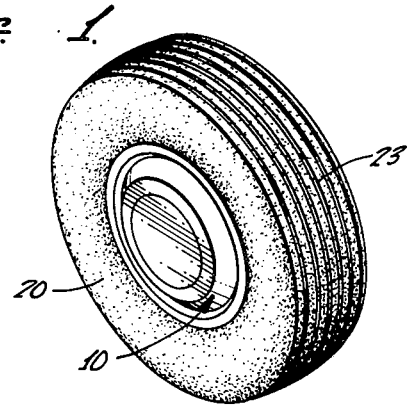
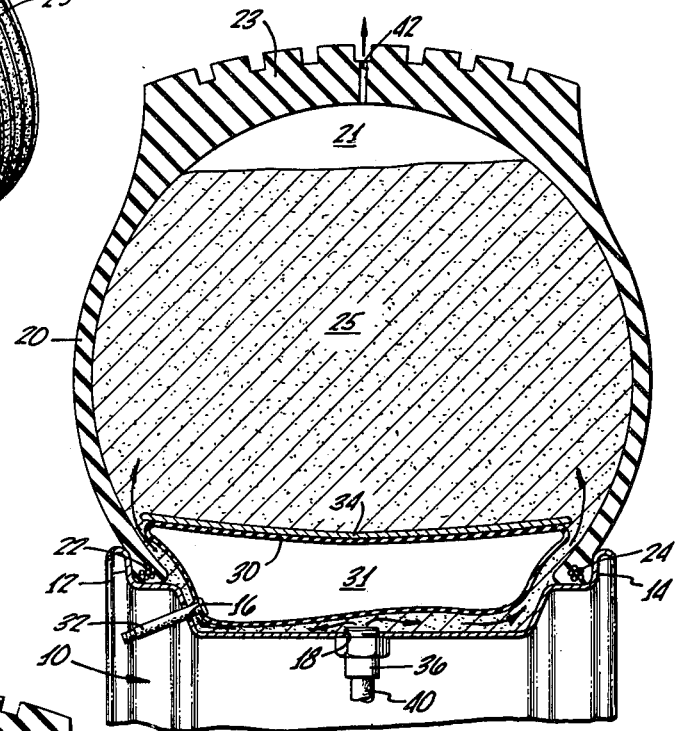
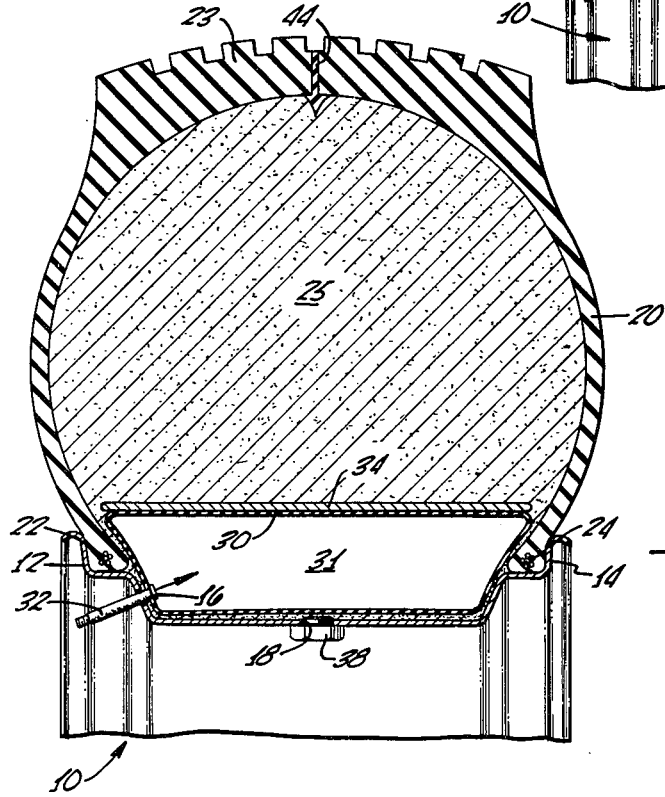

HYBRID SOLID FILLED PNEUMATIC TIRE

This is a division of application Ser. No. 514,656 filed Oct. 15, 1974, now abandoned, and a continuation-in-part of my prior application for Hybrid Solid Filled Pneumatic Tire, Ser. No. 397,940, filed Sept. 17, 1973, also abandoned.

BACKGROUND OF THE INVENTION

The present invention relates to deflation proof tires and more particularly concerns a solid-filled tire having improved characteristics. Solid rubber tires and solid-filled tires find continued use in wheeled vehicles, particularly in those units adapted for relatively low speeds and support of heavy loads. The solid-filled tire, of course, has the major advantage of increased wear and proof against puncture and deflation caused by various types of road hazards. Inflated or pneumatic tires on the other hand, have many advantages including those relating to improved ride characteristics.

Operation of the inflated tire depends primarily upon stresses imposed upon the tire casing. In general, proper inflation maintains the casing under substantially evenly distributed pressures or tension. Upon deflation, due to puncture or other hazards, the inflated tire can no longer function properly. In the light of this problem, many attempts have been made to replace the inflation fluid by non-compressible or elastic solid material such as sponge rubber or the like. However, such tires either have excessive stiffness or do not provide required stress distribution.

Lack of proper stress distribution under load is a major problem of filled tires. Thus, under high torque conditions, the filled tire will often tend to slip on the wheel rim. This is due to the fact that pressure applied to, by and throughout the filled tire is not uniform throughout the tire as it is with the pneumatic tire. In the pneumatic tire, as weight is applied to the vehicle, the additional pressure resulting from compression from the tire distributes itself equally throughout the tire and applies equal pressure to force the tire bead against the rim of the wheel thereby increasing the resistance to slippage of the casing relative to the wheel rim.

In the solid or solid filled tire, this slippage resistance is greatly decreased. Added pressure, as a result of load on the vehicle, results in localized compression of the tire and fill material at the lower part of the wheel, that is, between the wheel axis and the point of contact with the ground. Furthermore, this pressure is not distributed evenly throughout the tire but actually tends to raise the upper part of the tire relative to the wheel itself. This has the effect of relieving the pressure and thereby the frictional forces between the upper portion of the tire and the wheel, wherefore the tendancy to slip in the presence of high torque is increased.

Still another disadvantage of the solid or filled tire is its tendancy to transmit road shocks directly to the wheel and thus to the entire suspension system when the solid tire or fill material reaches a stressed condition of decreased compressibility.

An attempt to solve some of these problems is shown in the patent to Fischman U.S. Pat. No. 3,205,928 wherein a solid rubber tire is mounted upon a wheel having at least one removably secured flange and an inflatable tube to obtain a desired gripping relation. However, this solid tire, just as other solid tires, requires special tire construction and also special wheel construction. Use of such an arrangement requires total replacement of present tires and wheels, whereas it is highly desirable to provide protection against deflation in existing, conventional tires and wheel assemblies.

Accordingly, it is an object of the present invention to provide a deflation-proof tire that is substantially free of disadvantages inherent in solid and solid-filled tires previously known.

SUMMARY OF THE INVENTION

In carrying out principles of the present invention in accordance with a preferred embodiment thereof, a tire casing is filled at least in part with a liquid solidifiable fill material which is retained within a predetermined portion of the case and at least partially solidified while so retained. In one embodiment of the invention, the liquid material is retained by rotation of the wheel and tire that urges the liquid fill material outwardly of said wheel toward said casing, while solidification begins. In another embodiment of the invention, the solid filled casing includes a pressurized tube at a radially inner portion thereof, extending between the casing beads and wheel rims whereby a portion of the tire including the tread portion embodies non-deflatable, deflation-proof, solid-fill material and yet evenly distributed fluid pressure is available to secure the tire casing beads to the wheel rims, and to partially cushion application of road shock to the wheel. An expansion limiting circumferential belt on the pressurized tube permits use of a high-fluid pressure without degrading softness of the ride provided by the solid fill material. According to one method of carrying out the invention, a tire casing is mounted upon a wheel and the interior of the casing is filled with a solidifiable elastic fill material in liquid form. The liquid is confined in such a configuration as to retain a fluid chamber within the casing at a radially inward portion of the casing, extending between the casing beads and wheel rims. The fluid chamber is pressurized to lock the beads to the wheel rims. If deemed necessary or desirable, the fluid chamber is provided with means for restraining radially outward expansion of the fluid chamber and for directing pressure thereof axially outwardly towards the beads to urge the casing against the wheel rims.

BRIEF DESCRIPTION OF THE DRAWINGS

FIG. 1 is a perspective view of a tire and wheel of the present invention;

FIG. 2 is a sectional view of a portion of one embodiment of a wheel and tire assembly incorporating principles of the present invention, illustrated during filling of the tire;

FIG. 3 shows the wheel and tire of FIG. 2 in completed condition; and

DETAILED DESCRIPTION

Figure 4:
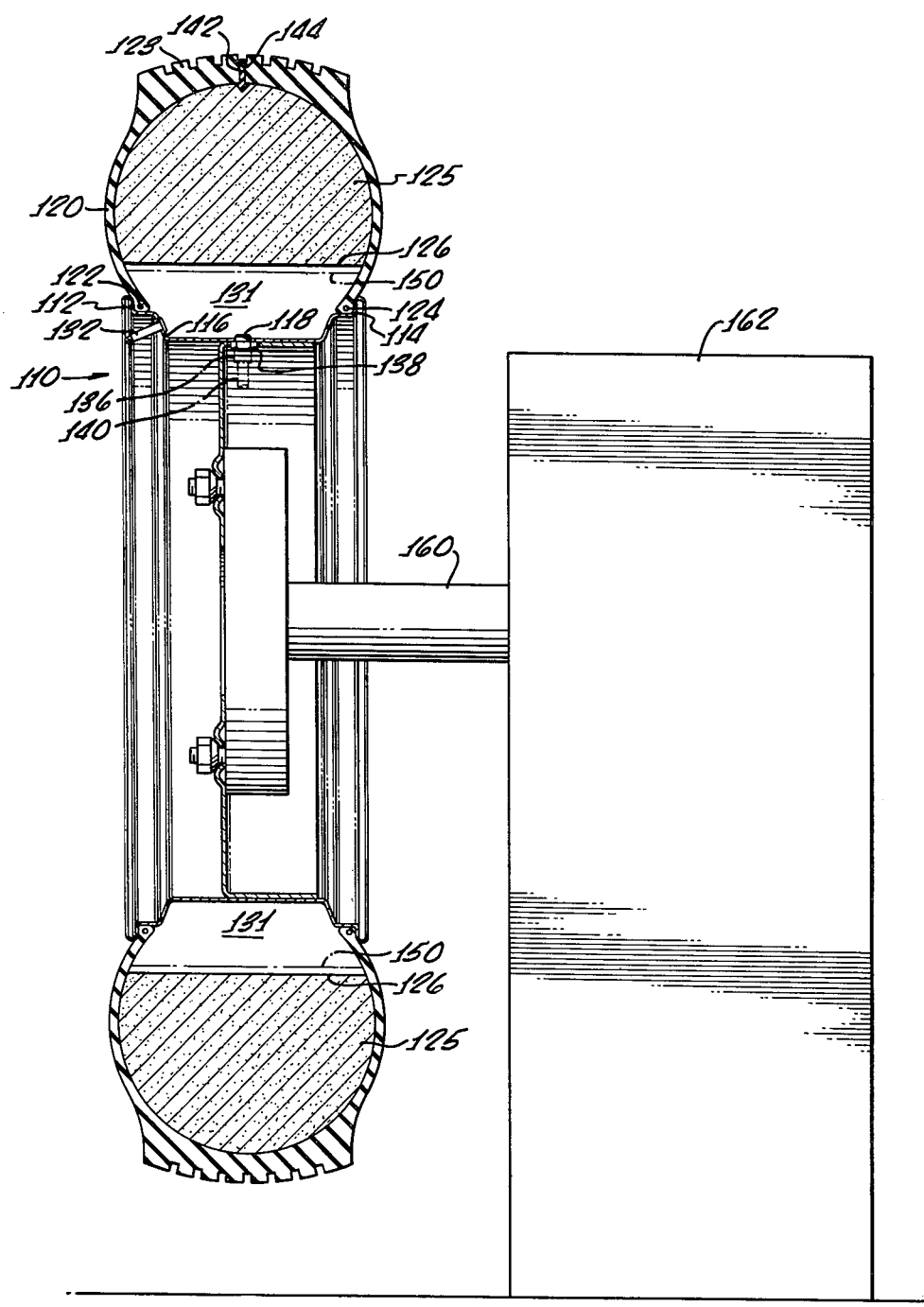
FIG. 4 illustrates another embodiment of the invention with liquid fill material being centrifugally positioned.

Referring to the drawings, a substantially conventional vehicle wheel 10 is formed with oppositely disposed wheel rims 12, 14 and a valve stem receiving aperture 16. This otherwise substantially conventional wheel, which may be of the type commonly employed with tubeless tires, is modified by forming an internally threaded aperture 18 through an intermediate portion of its conventional dropped center, for purposes to be described hereinafter.

A tire casing 20 is formed with casing beads 22, 24 adapted to seat upon and seal against the wheel rims 12, 14 respectively. The casing 20 may comprise a substantially conventional tubeless tire adapted to be mounted upon the wheel 10 with its beads 22, 24 seated and sealed against the wheel rims 12, 14 in the conventional and well known manner of the widely employed tubeless tire and wheel. Although a tubeless type tire is illustrated for purposes of exposition, it will be readily appreciated that principles of the present invention are also applicable to common tube-type tires.

Also mounted upon the wheel and within the casing chamber 21 formed by the shell of the casing 20, is an inflatable tube 30 having an inner diameter such as to make the tube a relatively snug fit over the wheel 10.

Tube 30 has an outer diameter, when partly pressurized, that is considerably less than the outer diameter of the casing. In other words, the inflatable tube 30 extends radially of the casing from the wheel only a relatively short distance. Further, the tube 30 has a width (the dimension as measured from left to right as viewed in FIG. 2) sufficient to allow it to extend substantially completely across the width of the wheel from rim 12 to rim 14, with the casing beads 20, 24 interposed between the tube and the respective wheel rims. Tube 30 is provided with a valve stem 32 that is substantially conventional. However, the valve stem 32 is free of air venting ribs found in the valve stem of the conventional tube tire valve. Thus, the stem 32 is made with a smooth outer surface so as to provide a close, snug and substantially liquid tight fit in the valve stem aperture 16 formed in the wheel 10.

An inextensible belt 34 of a suitable high strength relatively inextensible material such as woven steel, fiberglass, or other conventional tire cord materials, is formed integrally with or adhesively bonded to the radially outer surface of tube 30. The inextensible belt 34 has a width (an extent from left to right as viewed in FIG. 2) sufficient to extend almost entirely across the casing chamber from one side wall of the tire casing to the other.

The tube 30 defines an internal pressurizable fluid chamber 30 that confines a relatively high pressure gas, such as air, during operation of the wheel and tire assembly. This high pressure provides forces directed axially outwardly against the casing beads to securely attach the tire to the wheel.

The exterior of the belted tube and the interior of the casing define a casing chamber 21, which in the embodiment illustrated in FIG. 2 emcompasses the major portion of the volume within the tire casing. This chamber extends from the radially outermost portion (treadwall) 23 of the casing where the conventional tire tread is provided, radially inwardly to a limiting boundary that is defined by the radially outward portion of the belted tube. Casing chamber 21 (shown partly filled in FIG. 2) is filled with a solid elastic fill material 25 of predetermined resiliency and cushioning characteristics.

Many well known elastic fill materials compatible with the tube and casing may be employed. The solid elastic fill material may be placed and formed within the casing before the latter is assembled upon the wheel. Alternatively, it may be placed within the casing in a relatively compact form as by employing a blended rubber incorporating blowing agents and, after assembly upon the wheel, cured to cause the solid elastic fill material to expand to limits defined by the casing and the partly inflated belted tube. Nevertheless, significant improvements are afforded by employing a solidifiable liquid fill material that is injected into the casing chamber in liquid form and maintained within a selected portion of the chamber at least until it has partially solidified. This liquid filling considerably simplifies the manufacture of a solid fill or hybrid tire, and enables ready conversion of conventional tires to solid or hybrid form. The solidifiable liquid is applicable to the conventional and widely used drop center wheel since it can be readily applied after the casing is mounted upon the wheel. It does not require a split wheel that must be used if preformed materials or other nonliquid materials provide the solid fill. Accordingly, in a preferred form of the invention, the solid elastic fill material is injected into the casing chamber in liquid form and thereafter, cured or otherwise caused to solidify. Various well-known types of heat or room temperature curable elastomers are known that may be employed by injection in liquid form through the fill hole 18 and then heating the material to achieve solidification. A form of liquid elastomer that may be used as the solidifiable elastic fill material 25 is a material sold under the trademark "TyrFil" distributed by Synair Corporation of 17452 Irvine Boulevard, Tustin, California, the assignee of the present invention. Such an elastomer includes materials described in my copending application for Flat Free Pneumatic Tire and Void-Free Filling Therefor, Ser. No. 404,856; filed Oct. 10, 1973, now U.S. Pat. No. 3,866,651 the disclosure of which is hereby incorporated by this reference as though set forth in full. As described in the application Ser. No. 404,856 a flat free penumatic tire is formed by confining within a pneumatic tire casing an essentially void free elastomeric filling material which is the product of the reaction of, in the essential absence of foam producing material in the reaction zone, a defined prepolymer and a defined other reactant where said prepolymer reactant is selected from the class consisting of (1) organic polyisocyanate and hydroxyl group terminated polyfunctional polyether, wherein essentially all the prepolymer terminal groups are isocyanate groups, (2) organic polyisocyanate and hydroxyl group terminated polyfunctional polyether, wherein essentially all the prepolymer terminal groups are isocyanate groups, (3) organic polyisocyanate and hydroxyl group terminated polyfunctional polyether wherein essentially all the prepolymer terminal groups are isocyanate groups which groups have been blocked to afford "isocyanate" reactivity only at elevated temperature, and (4) organic polyisocyanate and hydroxyl group terminated polyfunctional polyester wherein essentially all the prepolymer terminal groups are isocyanate groups which groups have been blocked to afford "isocyanate" reactivity only at elevated temperatures. Said other reactant is hydroxyl group terminated polyfunctional polyether, in the case of said prepolymer (1) and said prepolymer (3) to obtain poly(ether)urethane elastomeric material, said other reactant is hydroxyl group terminated polyfunctional polyester, in the case of said prepolymer (2) and said prepolymer (4) to obtain poly(ester)urethane elastomeric material, said polyurethane elastomeric material being characterized in part by an essential freedom from voids.

The method of producing this tire, as described in application Ser. No. 404,856 comprises affording a gas escape outlet in a tire casing mounted on a wheel rim and setting the escape outlet at the upper most point of the tire during entry of the liquid filling material inside said casing and intimately intermingling the described reactor materials, essentially free of foam producing material, to produce said liquid filling material without use of foam producing material. The intermingled reactants are introduced into said casing prior to gelation of said reactants in said vessel, the introduction being at a point of said casing whereby gas within the casing is forced upward and outward through the escape outlet and no substantial amount of the gas is entrained into the liquid reactants mixture. The reactants mixture is cured within the casing to obtain a tire casing at least in part filled with a polyurethane elastomer, which elastomer is essentially free of voids.

A specific example of a liquid system useful in this invention as a tire fill material and which will polymerize to a suitably soft and resilient rubber upon curing may be prepared in accordance with the following description:

An isocyanate terminated prepolymer containing 6.95% free NCO is prepared by reacting a poly (ethylene adipate) glycol, having an approximate equivalent weight of 650, with Toluene Diisocyanate. The chemistry of prepolymer preparation is well established and covered by many reviews in the chemical literature. One source of information is an article by Saunders J. H. on K. C. Frisch in "Polyurethanes, Chemistry & Technology. I, Chemistry" Interscience 1962. A poly (ethylene adipate) glycol having an equivalent weight of 625 is sold by Indpol Corporation of Cucamonga, California, under the trademark "Estrol 600".

57 parts by weight of the above prepolymer are then mixed thoroughly with 43 parts of "Estrol 600" to which .03% stannous octoate catalyst had previously been added.

Mixing takes place either by machine or by hand at room temperature for approximately 5 minutes, that is, for a period sufficient to ensure a blending of colors of the two components, where such components are initially colored with different colors to facilitate identification of the occurrence of adequate mixing. The pot life of the mixture is approximately eight hours at room temperature.

This mixture is then injected into the prepared wheel and tire casing as described above and allowed to cure for 12 hours at 200° F. The liquid mixture will cure with the following physical characteristics:

| Tensile strength approximately | 1400 p.s.i. |
| Elongation to rupture | 500% |
| Tear Strength (Die C) | 68–75 p.l.i. |
| Durometer hardness, A scale | 30± |

The physical characteristics of the cured material can be changed within a limited range by changing the ratio of "Estrol 600" to prepolymer. It is found that 50 parts of "Estrol 600" mixed with 50 parts of prepolymer will result in a cured rubber with a durometer hardness of 43 on the A scale. Hardness decreases as the mixture is changed from this equal part mixture within a range of from 40 parts polymer with 60 parts "Estrol 600" to 60 parts polymer with 40 parts "Estrol 600". This range of mixtures will provide a durometer hardness in the range of 25–43 on the A scale.

The material specifically described above has certain advantages and disadvantages compared to the "TyrFil" material, also mentioned above. The specific material of the example has improved elongation and tear resistance characteristics whereas "TyrFil" material has less cold set and is less expensive. Obviously, other well known materials may be employed and may exhibit advantages in certain aspects and disadvantages in others. However, a significant feature of one method of the present invention is the retrofitting or modification of a conventional tire casing (tube type or tubeless, automobile, truck, bicycle or other vehicle) and a conventional wheel therefor, by applying to such conventional assembly a liquid solidifiable fill material.

Where the solid elastic fill material employed is injected as a liquid and then allowed to solidify, assembly of the tire and wheel may proceed by preparing a conventional wheel (already having a properly positioned air valve stem hole) with a second hole, a fill hole, that is internally threaded to receive a fill fitting 36 (FIG. 2) and, thereafter a plug 38 (FIG. 3) as will be described below. The particular positions of the holes in the wheel, one for the air valve stem and the other for injecting the liquid fill material may be widely varied without departing from principles of the present invention. Thus, for example, an existing valve stem hole formed in the conventional wheel rim, if properly positioned, may be used either for the valve stem or for the fill hole. In any event, a second hole will be formed in the wheel (or elsewhere) according to the present invention. One of the holes is employed for a fill hole and the other employed to receive the valve stem of the tube 30. Preferably, the hole to be used for fill is internally threaded to receive the externally threaded fitting 36 of a valve controlled conduit 40 through which the liquid fill is introduced.

It will be readily appreciated that the solidifiable fill material may be injected through a hole temporarily formed in some portion of the casing, either side wall or treadwall. Thus, no additional hole need be made in the wheel and pressure of the tube need not be overcome during filling of the casing chamber.

After forming the appropriate valve and/or fill holes in the wheel (or casing), tube 30, according to one embodiment of the invention, is mounted to and within the casing or carcass of the tire and the valve stem of the tube is inserted through the appropriate aperture as for example, aperture 16 in FIG. 2. The tube 30 is then inflated to a relatively low pressure such as 5 lbs. per square inch or less above ambient pressure. The inflation pressure of the tube is sufficient to cause the tube to assume a normal self-supporting but substantially unstressed (in tension) configuration wherein it will be in contact with the casing beads on opposite sides of the wheel and with the outer periphery of the wheel along the radially inner portion of the tube. The radially outer portion of the tube assumes a flattened configuration under constraint of the peripheral belt 34 formed on or adhesively bonded to the tube.

The initial low pressure filling of the tube performs two functions. The first of these functions is to press the beads 22, 24 against the wheel rims 12, 14 and thus, attain a degree of liquid sealing between the beads and the rim. A second function of the inner tube is to complete and define a lower boundary of the casing chamber 21 that is to be filled by the liquid elastomer.

A vent hole 42 is formed in a suitable portion, such as the tread of casing 20.

Now the fill fitting 36 is attached to the fill hole 18 and liquid fill material is pumped through the aperture 18 and allowed to flow into the tire casing. FIG. 2 illustrates the assembly during injection of the liquid fill material. The liquid fill material is caused to flow under a pressure that is greater than the relatively low pressure (about 5 p.s.i.) of the tube so as to allow the higher pressure of the liquid to force the tube from the fill opening and allow the liquid to flow between the wheel and the tube. The pressurized liquid elastomer continues to flow around the tube 30, between the tube 30 and the casing 20 and into the interior of the casing. During this flow, air within the casing is vented through aperture 42.

When the liquid fill material has completely filled the casing chamber and begins to flow through the vent hole 42, a valve (not shown) of the fill fitting conduit is closed, and a plug 44 (FIG. 3) is inserted in the vent hole 42 to prevent further loss of fill material.

The fill fitting is again opened and the pressure in the liquid fill material caused to be equal to that in the tube 30. This equalization of pressure may be achieved either by decreasing pressure in the liquid fill material or, in the alternative, by slightly increasing pressure in the tube 30. The latter is preferred. The purpose of this substantial equalization of pressures in the casing chamber and in the fluid chamber of tube 30 is to ensure that the tube 30 attains a predetermined configuration in which its radially outer surface defines the predetermined radially inward boundary surface of the solid fill material. This also exerts a force on the confined liquid fill material, urging the liquid outwardly of the wheel and toward the tread and side walls of the casing.

After equalization of pressures, the fill fitting is removed and fill aperture 18 is sealed by a threaded plug 38.

It will be noted that, after partial or full solidification of the fill material, the tube 30 is no longer necessary since the required fluid chamber, that is pressurized to secure the casing bead to the wheel rim, is formed by the solidified fill material itself. During the injection of the liquid elastomer, the liquid material flows between the bottom or radially inward surface of the tube 30 and the wheel and also flows between the tube and the casing as shown in FIG. 2. Some of this liquid material remains in such position and solidifies there during the cure. This liquid material also flows to and around the valve stem 32 to seal the latter in the wheel aperture 16, providing an airtight pressure seal where the close fit of smooth valve stem aperture 16 had previously provided a substantially liquid tight seal. Thus, it will be seen that the tube 30 performs several functions. It is employed as a device for pneumatically securing the casing beads to the wheel rims, being reinforced by being entirely encased in the cured air-impervious elastomer. Further, the tube 30 is useful during the injection of the liquid fill material to ensure and enhance the liquid seal between the casing and the wheel rim and also to afford a properly positioned boundary within the casing chamber to delimit the solid fill and force it into proper position.

After solidification of the liquid elastomer fill, the fluid chamber 31 is inflated, filled with a gas such as air under a pressure of from 20 to 130 or more pounds per square inch. The final configuration is illustrated in FIG. 3.

It will be seen that the fluid chamber 31 formed within the tube 30 distributes additional compressive forces, to which the wheel and tire may be subjected, equally throughout the assembly. Concomitantly, the bulk of the casing, being filled with the solid elastic fill material, is now impervious to deflation caused by punctures or tears.

Further, the described arrangement, embodying pressurized fluid chamber within the casing, greatly diminishes transmission of shock to the wheel in that as the solid fill material reaches its limit of compressibility, shock still must travel through the fluid chamber, thus providing additional compressibility in the path of shock transmission.

Significant economic advantages accrue from the above-described design. The scope of use of the filled tire is broadened and may now extend well beyond the slow moving industrial vehicle to the faster highway vehicles, and possibly to passenger car wheel-tire combinations. Elimination of down time of expensive equipment and reduction of maintainence costs are also inherent in the described system.

It will be readily appreciated that the relative volumes of areas encompassed by the solid elastic fill material 25 (in chamber 21) and the fluid chamber 31 within the overall volume of the casing may be varied to suit desired operating conditions. Thus, it is possible to employ the present invention in a tire having either one inch of fill material (as measured radially inwardly from the tire tread) or as much as six inches of fill material, with the remainder of the radially inner portion of the casing being taken up by the pressurizable fluid chamber formed by the belted tube. Where road conditions are good and punctures most likely to result from relatively short objects, a lighter weight assembly having a smaller amount of filled material may be employed and thus the tire wheel assembly cost may be minimized and greatest advantage taken of the benefits of a relatively large fluid chamber. On the other hand, where road conditions and hazards are such that sidewall damage is possible, or deep punctures may result, the fluid chamber will be made with considerably smaller outer radius thereby allowing a greater thickness of fill material (as measured radially of the tire.

Further, the fluid chamber formed by the tube 30 may be filled with a compressible fluid compatible with the tube material and having improved heat transfer characteristics, to improve the transfer of heat from the tire to the wheel and thence for dissipation into the atmosphere.

Although the realtively inextensible belt on the outer periphery of the tube 30 is preferred to allow considerably higher fluid pressures with the tube 30, the embodiment of the invention shown in FIGS. 2 and 3 may be practiced without the belt 34 in those situations where the fill material is of a type and thickness sufficient to withstand the inflation pressure employed within the tube 30 as being necessary to ensure attachment of the casing beads to the wheel rims. Nevertheless, the use of steel, glass or other belting on the tube 30 ensures appropriate operation in the presence of a relatively high fluid pressure within the tube 30.

The tube 30 also operates to reduce the weight of the filled tire since the density of the air that is normally used to fill the tube is considerably less than the density of the fill material 25 within the casing chamber.

With the use of the inextensible belt 34 circumscribing the fluid chamber 31, the described combination of wheel and tire may be employed with a fill material providing an equivalent air pressure of approximately 30 pounds per square inch whereas the pressure in the fluid chamber, restricted against radially outward expansion by the belt 34, may be as high as 120 to 130 pounds per square inch. This will provide a relatively soft ride and, at the same time, minimize slippage of the tire on the rim under excessive load and torque conditions. The belt also permits a flatter arc across the tread surface of the tire to thereby provide better traction and increased tread life.

Thus, it will be seen that the simple package of a belted inflatable tube and a quantity of liquid elastomer may be readily retrofitted to conventional tire and wheel assemblies, replacing the tube of the tube type and being added to the tubeless type, to provide greatly enhanced puncture resistance.

Another embodiment of the invention is illustrated in FIG. 4. In this embodiment, the hybrid solid filled tire assembly of wheel and casing includes a centrifugally distributed solidified elastomer at least partially filling the interior of the casing. The elastomer, while in liquid form, is positioned within a predetermined volume of the casing, at least as it begins to solidify, by means of centrifugal force generated by rotation of the assembly. The rotation causes the liquid material to flow to a position of centrifugal distribution through at least an outer generally annular portion of the casing chamber. It remains in such position as it solidifies, and thereafter. Thus, the elastomer is retained in its solidified position of centrifugal distribution. This arrangement is preferred because it has advantages, including elimination of the infaltable tube, such as tube 30 of the embodiment of FIGS. 2 and 3.

The embodiment of FIG. 4 is preferably practiced without the use of a separate inflatable tube within the casing. Accordingly, a wheel 110 having an air valve aperture 116 and an air valve 132 is prepared with an aperture 118 receiving a fill fitting 136. A tire casing 120 having casing beads 122, 124 is seated upon rims 112 and 114 of the wheel. The casing tread wall 123 is formed with an air vent 142 and cooperates with the walls of the casing and the wheel 110 to define a casing chamber that is at least partially filled with a solidified centrifugally distributed elastomer 125. Elements of the embodiment of FIG. 4 described to this point are all identical to the corresponding elements of the embodiment of FIGS. 2 and 3. Corresponding elements of FIG. 4 are identified by the same reference numerals of the earlier embodiment but have the prefix "1" distinguishing elements of FIG. 4.

Although the embodiment of FIG. 4 does not employ an inner tube 30, it does include a pneumatically inflatable inner fluid chamber 131 formed between the outer periphery of wheel 110 and the elastomer 125 confined within the casing chamber.

In practicing the invention according to principles of the embodiment of FIG. 4, the wheel and tire casing are prepared just as described in connection with the embodiment of FIGS. 2 and 3 except that no inflatable tube 30 is employed. A liquid solidifiable fill material of any of the types described above in connection with FIGS. 2 and 3 is injected via a conduit 140 and fill fitting 136 into the casing chamber. The amount of injected fill material is carefully precalculated to fill a selected volume of the casing chamber. The filled volume may be substantially equivalent to the volume filled by the material in the embodiment of FIGS. 2 and 3. However, since no inflatable tube (such as tube 30 of FIG. 2) is employed, the injected liquid alternatively may fill the entire area defined between the inner surface of the casing walls and the wheel. Thus, the amount of liquid elastomer injected into the casing may be selected to fill any portion of the casing chamber up to substantially 100%.

When the pre-calculated amount of liquid fill material has been injected, injection of liquid material is stopped, the vent is sealed by the permanent plug 144, and the fill fitting 136 is removed and replaced by permanent plug 138.

After the predetermined (by emperical determination or by precalculation) amount of liquid fill material has been injected and the casing chamber has been sealed, the interior of the casing is pneumatically pressurized, via the pneumatic valve 132, to its final operating pressure. This ensures seating of the tire beads 122, 124 against the rim flanges 112, 114.

Now the liquid fill material is solidified. While it is being solidified, it is confined in a predetermined substantially annular volume of the casing chamber. This is achieved, without the use of any type of form or inflatable tube, by mounting the tire for rotation upon the shaft 160 of a conventional wheel rotating machine 162, such as, for example, the dynamic wheel balancer Model 33 or Model 303 of the Bear Manufacturing Company. The tire and wheel assembly, with the liquid fill material confined therein, is rotated while the elastomer begins to cure, to centripetally accelerate the liquid.

This rotation centrifugally distributes the liquid elastomer and confines the liquid in such distributed position until the material is solidified or at least partially solidified to a degree that enables it to retain its position of centrifugal distribution. The centrifugal forces urge the liquid fill material outwardly of the wheel toward the casing walls. The radially outwardly directed centrifugal forces acting upon the liquid are transmitted through the liquid in all directions and thus ensure that the material is pressed against all surfaces of all walls of the casing chamber at radially outer portions of the casing chamber. The pneumatic pressure within the air chamber 131 also acts to press the elastomer against the casing walls. The centripetal acceleration distributes and positions the elastomer so that the air pressure can properly press upon the inwardly facing surface of the body of confined liquid. Because the liquid fill is distributed by centrifugal forces, its inwardly facing surface 126 extends in a substantially straight line between the casing walls, parallel to the axis of rotation.

Rotation of the wheel and tire assembly is continued for the time identified above required to cure or solidify the particular liquid solidifiable material that is employed. The spinning tire and wheel assembly is maintained at the selected curing temperature for the selected curing time as identified above. Nevertheless, the spinning may be terminated when the material has only partly cured but has attained a stage of cure that is sufficient to enable it to retain its centrifugally distributed position within the tire casing.

Speed of rotation will depend upon the size and weight of the tire and the nature of the material employed, and is adjusted to ensure proper centrifugal distribution of the liquid material without exerting centrifugal forces that would significantly distort the tire shape. For a conventional automobile tire, it is found that rotation at an equivalent surface speed of approximately 40 miles per hour during solidification is adequate to achieve these desiderata.

The centrifugal distribution and positioning of the liquid fill material as it begins to cure has several advantages in addition to eliminating the need for the inflatable inner tube to provide a form for the liquid fill material. This method enables use of a liquid fill material on very large tires in which an inner annular air pressure chamber cannot be properly formed by an inflatable inner tube. In such large tires, an inflatable inner forming tube would be deformed or would be displaced when the liquid fill material is injected unless additional means, such as the centrifugal forces are employed. Displacement or deformation of the forming tube would result in improper distribution of the elastomer. Further, for use in a small cross-sectional diameter tire, such as a bicycle tire of which the conventional inflatable inner tube is injected with the solidifiable liquid fill material according to this invention, an additional inflatable inner tube is not and need not be employed to confine and position the liquid fill material during solidification. For use of the present invention in a bicycle tire or other tire of similar proportions and size, both the conventional inner tube and the casing are vented and both the casing and the inner tube are provided with the subsequently sealed fill hole for the injection of liquid fill material. In the bicycle tire, the inner tube is required to close the spoke holes in the rim of the wheel and accordingly, the tire casing itself cannot be sealed upon the conventional bicycle wheel. The method of applying the invention to bicycle tires is applicable to tube-type tires for automobiles and other vehicles.

According to an additional feature of the invention, the embodiment illustrated in FIG. 4 may be modified by adding a high-tensile strength and high-tear resistant layer to the inner periphery of the solidified liquid fill material. Such a layer is formed after the major body of fill material 125 has been solidified. After such solidification, a predetermined additional amount of the high-tensile strength and high-tear resistant solidifiable elastomer 150 (shown by a dotted line in FIG. 4) in liquid form is injected into the radially inner annular chamber 131 formed between the cured fill material 125 and the wheel. The assembly is again mounted upon the wheel spinner and centripetally accelerated until the second layer of material has solidified at least in part.

When the fill material of the tire of FIG. 4 occupies less than all of the interior of the casing, the filled casing incorporates an inner annular chamber 131 analagous to the chamber 31 of FIGS. 2 and 3. Chamber 131 is inflated to a suitable pressure, such as the normal operating pressure or a higher pressure to better hold the tire and enhance the retention of the casing upon the wheel. Such a higher pressure may be in the order of 120–130 lbs. per square inch, for example. Normal operating pressure may be between 20–50 lbs. per square inch within the pneumatically pressurizable chamber 131.

It will be readily appreciated that embodiments of the present invention may incorporate features of both the embodiment of FIGS. 2 and 3 and the embodiment of FIG. 4. In other words, the invention may be practiced by spinning the wheel of FIGS. 2 and 3 until the liquid solidifiable fill material solidifies at least in part. Accordingly, the invention may be practiced by forming and filling the wheel and tire assembly exactly as described in connection with FIGS. 2 and 3, and inserting tube 30 and pressurizing the tube to at least initially ensure proper volume and position of the liquid fill material. The tire assembly with the partly pressurized tube 30 and the liquid fill material therein is now mounted upon the wheel spinner and rotated at speeds identified above until the liquid material is cured or partly cured. However, it will be readily appreciated that the centrifugal force itself is sufficient to properly distribute and position liquid material and the sealing of the casing to the wheel will provide an appropriate pneumatically pressurizable inner chamber 131 without the need for the inner tube 30.

The foregoing detailed description is to be clearly understood as given by way of illustration and example only, the spirit and scope of this invention being limited solely by the appended claims.

What is claimed is:

1. The method of forming a solid fill tire and wheel assembly, said wheel having bead receiving rims and said tire including a casing having beads to be received by the wheel rims, said method comprising the steps of
    mounting the tire casing upon the wheel with the casing beads seated upon the wheel rims, thereby to define a casing chamber between the wheel and the casing,
    injecting into said casing chamber a liquid solidifiable fill material,
    maintaining a portion of said casing chamber between said beads and rims substantially free of said fill material to thereby define a fluid chamber within said casing between said beads and rim,
    solidifying said fill material within said casing chamber,
    pressurizing said fluid chamber to urge said beads against said rims, and
    limiting radially outward expansion of said fluid chamber by positioning an expansion limiting belt circumferentially around the periphery of said fluid chamber.

2. The method of forming a tire and wheel assembly comprising the steps of
    mounting a tire casing upon a wheel,
    injecting a liquid solidifiable fill material into said casing,
    solidifying said fill material,
    retaining said liquid fill material within a predetermined partial volume of said casing at least as it begins to solidify, by inserting an inflatable pneumatic tube in said casing and inflating said tube to urge said liquid fill material outwardly of said wheel toward said casing, and
    limiting radially outward expansion of said pneumatic tube by positioning an expansion limiting belt circumferentially around said tube.

* * * * *